(12) United States Patent
Hong et al.

(10) Patent No.: US 11,250,121 B2
(45) Date of Patent: Feb. 15, 2022

(54) METHOD OF OPERATING STORAGE DEVICE, AND SYSTEM FOR STORAGE DEVICE

(71) Applicant: Samsung Electronics Co., Ltd., Suwon-si (KR)

(72) Inventors: Hee-seok Hong, Yongin-si (KR); Seung-jun Oh, Seongnam-si (KR); Se-min Yim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 464 days.

(21) Appl. No.: 16/239,676

(22) Filed: Jan. 4, 2019

(65) Prior Publication Data

US 2019/0213320 A1    Jul. 11, 2019

(30) Foreign Application Priority Data

Jan. 8, 2018    (KR) .................. 10-2018-0002312

(51) Int. Cl.
*G06F 21/44* (2013.01)
*G06F 3/06* (2006.01)

(52) U.S. Cl.
CPC .............. *G06F 21/44* (2013.01); *G06F 3/062* (2013.01); *G06F 3/0629* (2013.01); *G06F 3/0659* (2013.01); *G06F 3/0679* (2013.01)

(58) Field of Classification Search
CPC ...... G06F 3/062; G06F 3/0629; G06F 3/0659; G06F 3/0679; G06F 21/44
USPC .............. 726/2; 713/170, 182, 913; 711/102
See application file for complete search history.

(56) References Cited

U.S. PATENT DOCUMENTS

| | | | |
|---|---|---|---|
| 7,970,982 B2 | 6/2011 | Kim et al. | |
| 8,052,049 B1 * | 11/2011 | Doland ................... | G06F 21/85 235/379 |
| 8,180,988 B2 | 5/2012 | Kwon et al. | |
| 8,634,557 B2 | 1/2014 | Nagai et al. | |
| 8,844,025 B2 * | 9/2014 | Russo ..................... | G06F 21/33 726/19 |
| 8,997,209 B2 | 3/2015 | Lee et al. | |
| 9,626,504 B2 | 4/2017 | Tomizawa | |
| 10,102,356 B1 * | 10/2018 | Sahin ................... | G06F 21/6218 |
| 2010/0069504 A1 | 3/2010 | Tarnus-Rondeau et al. | |
| 2010/0287380 A1 * | 11/2010 | Kurimoto ........... | G06F 12/1441 713/181 |
| 2013/0019055 A1 | 1/2013 | Kim et al. | |
| 2015/0100076 A1 | 4/2015 | Chin | |
| 2015/0242338 A1 | 8/2015 | Lee | |
| 2015/0242657 A1 * | 8/2015 | Kim ....................... | G06F 21/78 713/193 |

(Continued)

FOREIGN PATENT DOCUMENTS

JP        6069120        2/2017

*Primary Examiner* — Prabodh M Dharia
(74) *Attorney, Agent, or Firm* — Myers Bigel, P.A.

(57) ABSTRACT

A method of operating a storage device that is connected to a host includes entering an authentication mode; and performing the authentication operation responsive to entering the authentication mode. The performing of the authentication operation includes receiving a read command and a first random authentication address from the host; performing an authentication procedure based on at least a portion of the first random authentication address; and generating result data responsive to performing the authentication algorithm.

20 Claims, 12 Drawing Sheets

(56) References Cited

U.S. PATENT DOCUMENTS

| | | | |
|---|---|---|---|
| 2015/0278118 A1* | 10/2015 | Lee | G06F 12/1441 |
| | | | 711/102 |
| 2015/0350206 A1* | 12/2015 | Shin | G06F 12/1408 |
| | | | 713/170 |
| 2016/0285848 A1 | 9/2016 | Minami | |
| 2017/0017808 A1* | 1/2017 | Kwong | G11C 29/50012 |

* cited by examiner

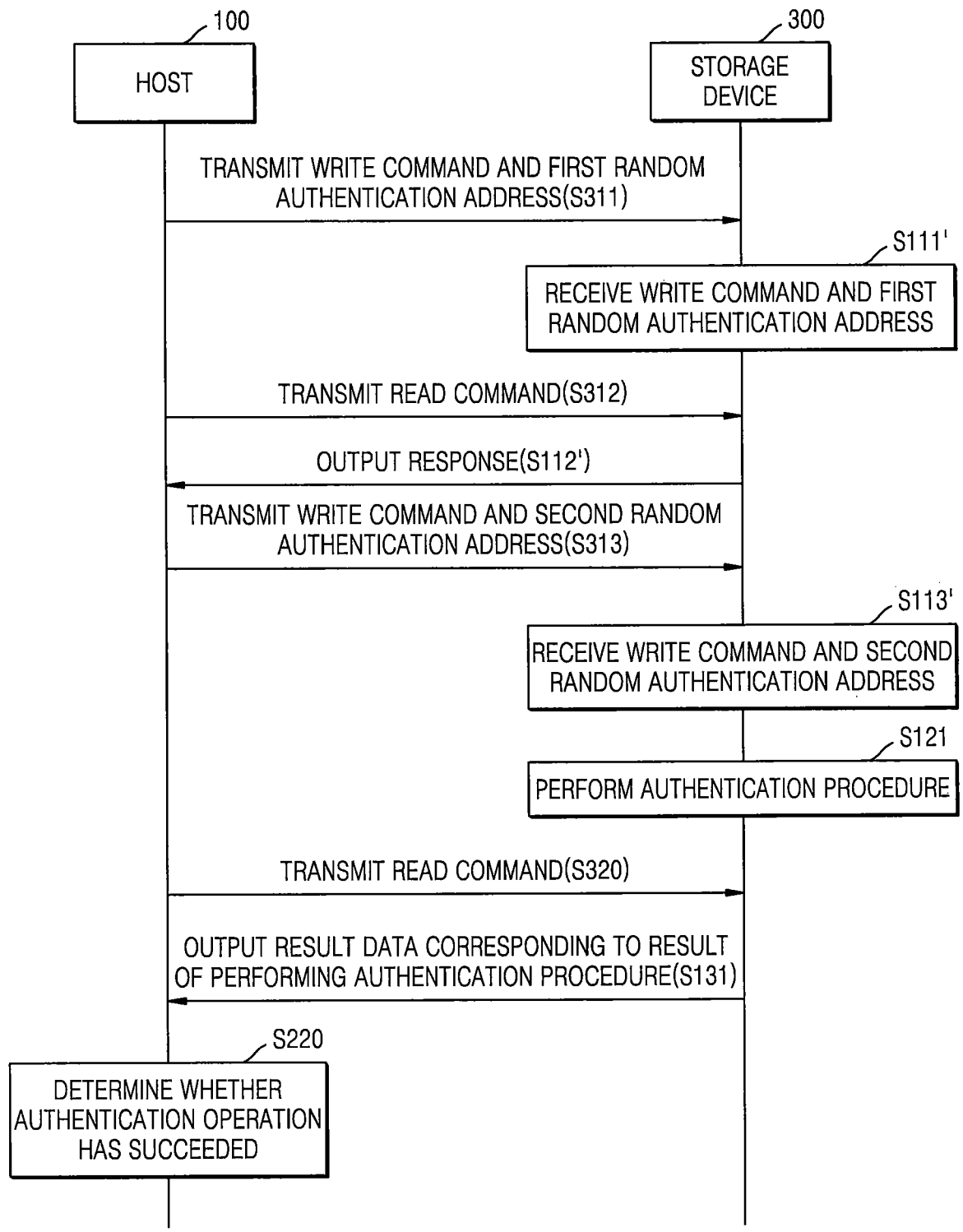

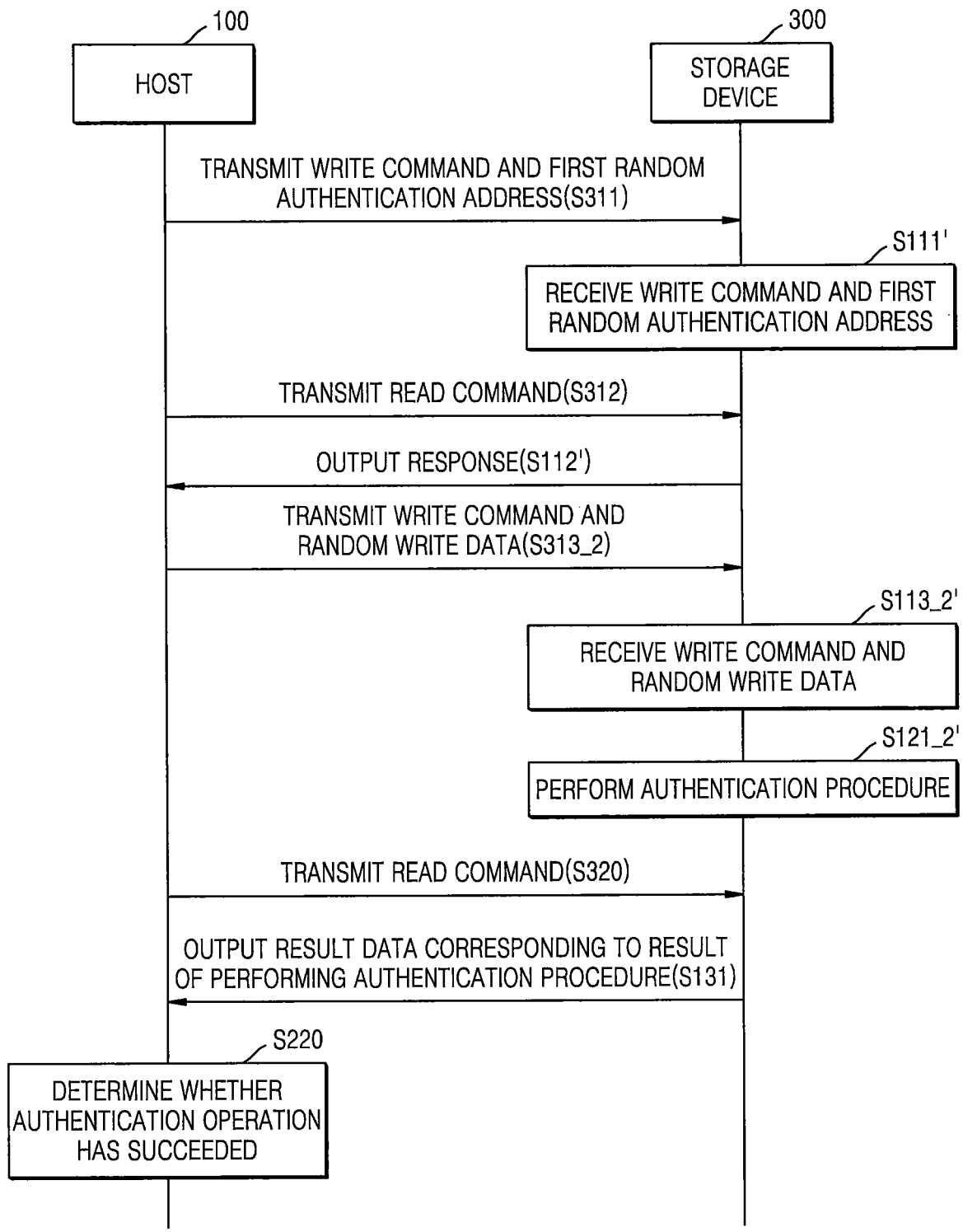

METHOD OF OPERATING STORAGE DEVICE, AND SYSTEM FOR STORAGE DEVICE

CROSS-REFERENCE TO RELATED APPLICATION

This application claims priority to Korean Patent Application No. 10-2018-0002312, filed on Jan. 8, 2018, in the Korean Intellectual Property Office, the disclosure of which is incorporated herein in its entirety by reference.

BACKGROUND

The inventive concept relates generally to storage device systems and methods, and, more particularly, to storage device systems and methods where the storage device is connected to a host via an intermediate converter.

Storage systems may include a host and a storage device, and the storage device may include a memory card for use in, for example, storing data or expanding a memory. Various types of memory cards may be used including, for example, a memory stick (MS), a multimedia card (MMC), an XD-picture card (XD), a secure digital (SD) card, a compact flash (CF) card, a smart media card (SMC), and a micro-drive (MD).

Such storage devices may follow specific standard protocols, and, thus, may use an intermediate converter, such as a dedicated card reader or a multi-type card reader, in accordance with the particular storage device that is used. The intermediate converter may input or output data to or from the storage device. Accordingly, when the storage device and the host are connected to each other via the intermediate converter, the host may not be able to recognize certain functionality of the storage device.

SUMMARY

The inventive concept provides a method of operating a storage device that is connected to a host, and a system that authenticates the storage device.

According to an aspect of the inventive concept, there is provide a method of operating a storage device that is connected to a host, the method including entering an authentication mode; and performing the authentication operation responsive to entering the authentication mode. The performing of the authentication operation includes receiving a read command and a first random authentication address from the host; performing an authentication procedure based on at least a portion of the first random authentication address; and generating result data responsive to performing the authentication procedure.

According to another aspect of the inventive concept, there is provided a method of operating a storage device that is connected to a host, the method including entering an authentication mode; and performing the authentication operation responsive to entering the authentication mode. The performing of the authentication operation further includes receiving a write command and a first random authentication address from the host; performing an authentication procedure based on at least a portion of the first random authentication address; and generating result data responsive to performing the authentication procedure.

According to another aspect of the inventive concept, there is provided a system including a storage device configured to perform an authentication operation in an authentication mode; and a host that is configured to perform the authentication operation performed by the storage device. In the authentication mode, the storage device is further configured to receive a read command and a random authentication address from the host, to perform an authentication procedure based on at least a portion of the random authentication address, and to generate result data responsive to performing the authentication procedure.

BRIEF DESCRIPTION OF THE DRAWINGS

Embodiments of the inventive concept will be more clearly understood from the following detailed description taken in conjunction with the accompanying drawings in which:

FIG. 12 is a flowchart of operations of a system according to further embodiments of the inventive concept; and FIG. 13 is a flowchart of operations of a system according to further embodiments of the inventive concept.

DETAILED DESCRIPTION OF THE INVENTION

Hereinafter, embodiments of the inventive concept will be described in detail with reference to the attached drawings. Like reference numbers signify like elements throughout the description of the figures. It is noted that aspects of the invention described with respect to one embodiment, may be incorporated in a different embodiment although not specifically described relative thereto. That is, all embodiments and/or features of any embodiment can be combined in any way and/or combination.

Storage devices that are connected to a host by, for example, an intermediate converter may be authenticated through use of write operations. When the storage device memory is full and/or write protected, however, it may be difficult or impossible to authenticate the storage device. According to some embodiments of the inventive concept, a storage device may be configured with an authentication operational mode and a normal operational mode. When in an authentication operational mode, the storage device may receive a read or write command and a random address.

Because the storage device is in the authentication operational mode, the read or write operation is not performed and, instead, an authentication operation is performed using at least a portion of the random address that was received. Thus, the storage device may be authenticated without the need for performing a write operation thereby allowing authentication of storage devices whose memories are full and/or write protected storage devices.

Figure 1:
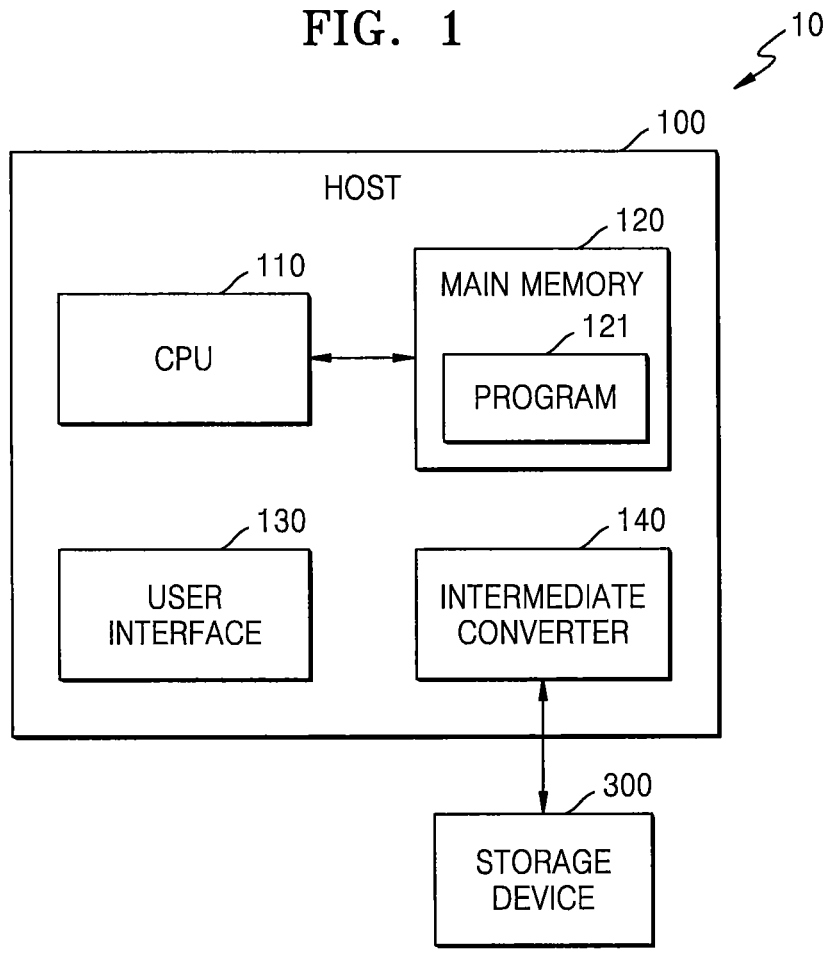
FIG. 1 is a block diagram of a system according to some embodiments of the inventive concept.

FIG. 1 is a block diagram of a system according to some embodiments of the inventive concept.

Referring to FIG. 1, a system 10 that is configured to authenticate a storage device 300 includes a host 100 and the storage device 300. The storage device 300 is connected to the host 100 via an intermediate converter 140.

The host 100 may include a central processing unit (CPU) 110, a main memory 120, a user interface 130, and the intermediate converter 140. The CPU 110 may control overall operations of the host 100 and perform logical operations based on the program 121 and/or data stored in the main memory 120. For example, the CPU 110 may include a general-use processor and a special-purpose processor.

The main memory 120 may be an operation memory of the CPU 110. The main memory 120 may store program code executable by the CPU 110 and data that are processed by the CPU 110. The main memory 120 may be random access memory (RAM). The main memory 120 may include volatile RAM, such as dynamic RAM (DRAM), static RAM (SRAM), or synchronous DRAM (SDRAM). The main memory 120 may include non-volatile RAM, such as ferroelectric RAM (FRAM), phase-change RAM (PRAM), magnetic RAM (MRAM), or resistive RAM (RRAM).

A program 121 that is executed by the CPU 110 may be stored in the main memory 120. The program 121 may provide additional functionality associated with the storage device 300. According to some embodiments, the program 121 may provide authentication functionality with respect to the storage device 300, such that the storage device 300 and the host 100 may perform authentication. In the system 10 according to some embodiments of the inventive concept, the program 121 may be configured to sequentially output pre-agreed sector addresses to the storage device 300 to authenticate the storage device 300. The sector addresses may be transmitted to the storage device 300 via the intermediate converter 140, and the storage device 300 may enter an authentication mode for performing an authentication operation. When the storage device 300 enters the authentication mode, the storage device 300 may transmit result data obtained by performing authentication operations to the host 100, and the program 121 may determine whether authentication with respect to the storage device 300 has succeeded, based on the result data.

The user interface 130 may facilitate communication with a user under the control of the CPU 110. For example, the user interface 130 may include user input interfaces, such as a keyboard, a keypad, a button, a touch panel, a touch screen, a touch pad, a touch ball, a camera, a microphone, a gyroscopic sensor, and a vibration sensor. The user interface 130 may include user output interfaces, such as a liquid crystal display (LCD), an organic light-emitting diode (OLED) display, an active-matrix OLED (AMOLED) display, a light-emitting diode (LED) display, a speaker, and a motor.

The intermediate converter 140 may be configured to read information from the storage device 300. The storage device 300 that is connected to the intermediate converter 140 may be a memory stick (MS), a multimedia card (MMC), an XD-picture card (XD), a secure digital (SD) card, a compact flash (CF) card, a smart media card (SMC), a micro-drive (MD), a solid state drive (SSD), a universal flash storage (UFS), a universal serial bus (USB) drive, or the like.

To perform a function independently supported by a manufacturing company of the storage device 300, the storage device 300 may be first authenticated by the host 100, and then the function may be performed by way of the program 121. The storage device 300 may sequentially receive sector addresses agreed upon with the program 121 to enter the authentication mode. The storage device 300 may include firmware and/or other program code that executes an authentication procedure that is requested by the program 121.

Figure 2:
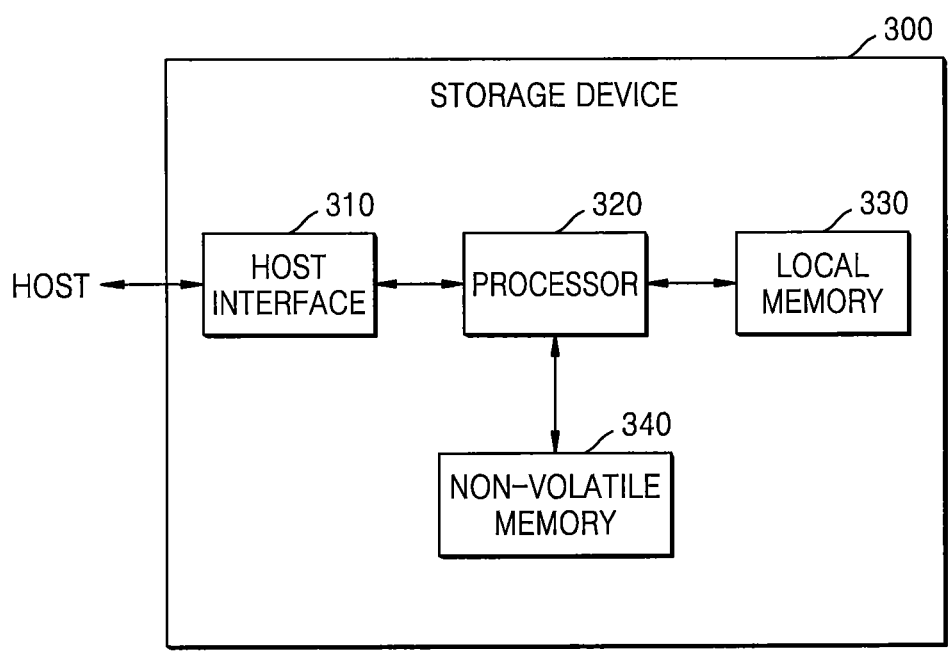
FIG. 2 is a block diagram of a storage device according to some embodiments of the inventive concept.

FIG. 2 is a block diagram of the storage device 300 according to some embodiments of the inventive concept.

Referring to FIG. 2, the storage device 300 may include a host interface 310, a processor 320, a local memory 330, and a non-volatile memory 340.

The non-volatile memory 340 may include flash memory, FRAM, PRAM, MRAM, RRAM, and electrically erasable programmable read-only memory (EEPROM). The processor 320 may access the non-volatile memory 340 in response to a command and an address received via the host interface 310.

The local memory 330 may be an operation memory of the processor 320. The local memory 330 may be a buffer memory and/or a cache memory. The local memory 330 may include volatile or non-volatile RAM, such as SRAM, DRAM, SDRAM, FRAM, PRAM, MRAM, or RRAM.

The host interface 310 may facilitate communication with a host 100. The processor 320 may receive a normal command and a normal address via the host interface 310 and access the non-volatile memory 340 according to the received command and address. The processor 320 may receive a command and addresses based on a predetermined rule via the host interface 310 and perform a specific operation in response to the received command and addresses. When the processor 320 sequentially receives pre-agreed sector addresses, the processor 320 may enter an authentication mode. The processor 320 may perform an authentication procedure in the authentication mode, and may output a result of performing the authentication procedure to the host via the host interface 310. The storage device 300 may include firmware and/or other program code that performs the authentication procedure, and the processor 320 may perform the authentication procedure by executing the firmware and/or other program code. However, the authentication procedure is not limited to being implemented using firmware and/or other program code, and may be implemented using hardware or a combination of program code and hardware in accordance with various embodiments of the inventive concept.

The storage device 300 included in the system 10 according to some embodiments of the inventive concept may be configured in different operational states or modes including a general mode and the authentication mode. In the general mode, the storage device 300 may perform an operation requested by a command received from the host 100. For example, in response to a read command and an address from the host 100, the storage device 300 may read data from a memory region corresponding to the address and output the read-out data to the host 100. In response to a write command and an address from the host 100, the storage device 300 may write data received together with the write command to a memory region corresponding to the address.

In the authentication mode, the storage device 300 may perform an authentication operation or procedure. For example, the storage device 300 may use a random authentication address received together with a command (read command or write command) as data for performing an authentication procedure. According to some embodiments, even when the storage device 300 receives a read command or a write command in the authentication mode, the storage device 300 may not perform a read operation or a write operation with respect to the non-volatile memory 340, in contrast with the general mode.

Figure 3:
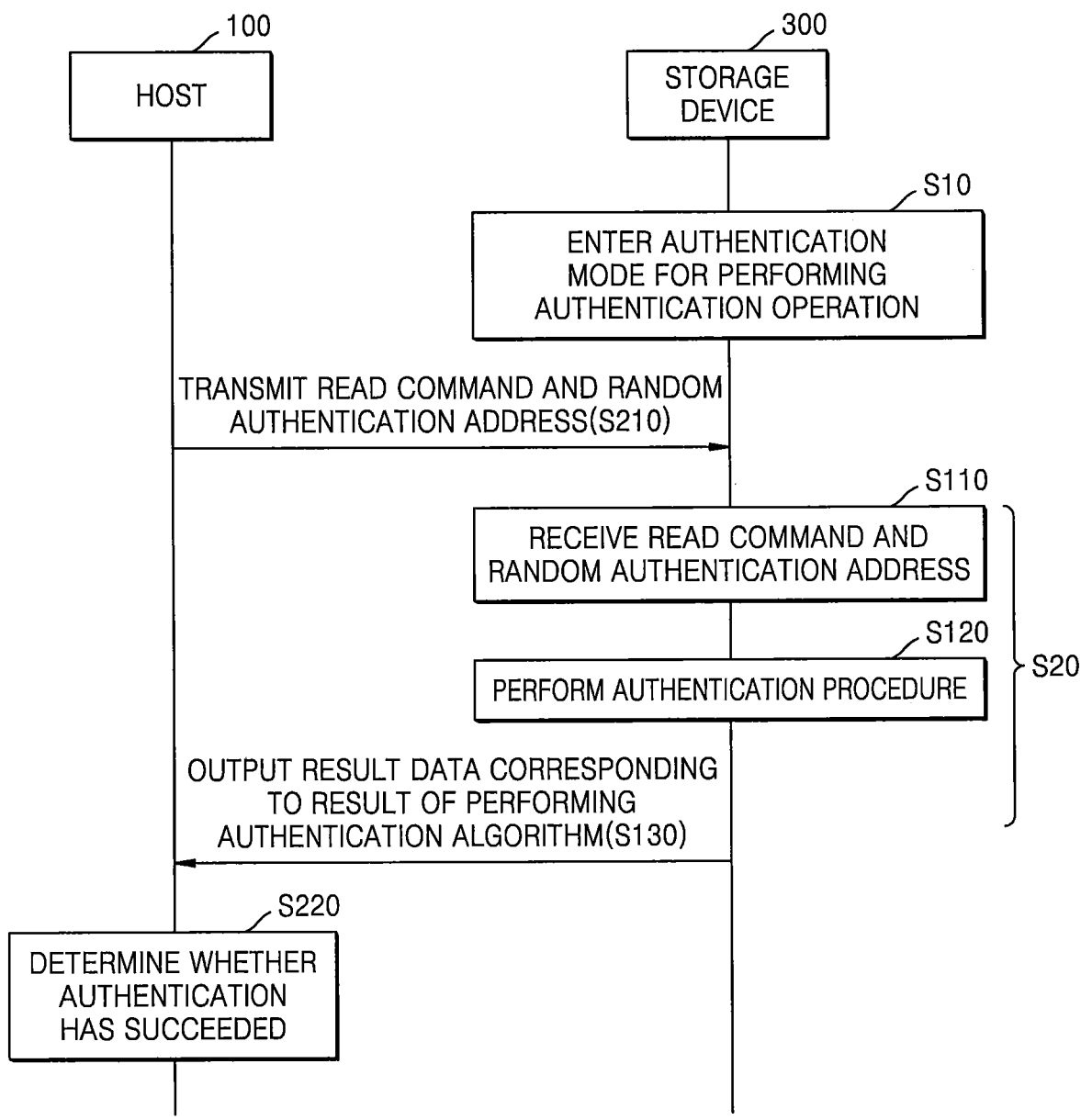
FIG. 3 is a flowchart of operations of a system that authenticates a storage device according to some embodiments of the inventive concept.

FIG. 3 is a flowchart of an operation of a system that authenticates a storage device, according to some embodiments of the inventive concept.

Referring to FIGS. 1 and 3, when the storage device 300 enters an authentication mode for performing an authentication operation or procedure, at block S10, the storage device 300 may perform an authentication operation or procedure (S20). The storage device 300 may be set to or configured in the general mode or the authentication mode. A method of processing a command and an address received from the host 100 may vary depending on the type of mode. The storage device 300 may enter the authentication mode under the control of a user while operating in the general mode, or may enter the authentication mode under the control of a user after being connected to the intermediate converter 140.

When the storage device 300 enters the authentication mode at block S10, the host 100 may transmit a read command and a random authentication address (S210). In the authentication mode (S20), the storage device 300 may receive the read command and the random authentication address at block S110. The random authentication address may not have a determined specific value and may have a random value in accordance with some embodiments of the inventive concept.

At block S120, the storage device 300 may perform an authentication procedure. For example, the storage device 300 may perform an authentication procedure by using at least a portion of the received random authentication address as data for performing the authentication procedure. The storage device 300 may generate result data by performing the authentication procedure.

According to some embodiments, even when the storage device 300 receives a read command or a write command in the authentication mode (S20), the storage device 300 may not perform an operation based on the received read command or write command. The storage device 300 may perform an authentication operation or procedure by using a random authentication address received together with the read or write command. Although an example where a read command is received is illustrated in FIG. 3, systems according to embodiments of the inventive concept are not limited thereto, and an example where a write command is received will be described below with reference to FIG. 8.

An internal authentication procedure for authentication may be any of various public or private authentication and/or cryptographic techniques including, for example, a Hash-based Message Authentication Code (HMAC), a Rivest Shamir Adleman (RSA) technique, a Custom Algorithm, a Digital Signature Algorithm (DSA), an Elliptic Curve Digital Signature Algorithm (ECDSA), a cipher block chaining message authentication code (CBC-MAC), MD5, a Secure Hash Algorithm-256 (SHA256), Hash Algorithm Standard 160 (HAS160), SEED, and/or CRYPTON. Systems according to embodiments of the inventive concept are not limited to the aforementioned types of authentication techniques and procedures.

According to some embodiments, the storage device 300 may receive a read command and a random authentication address a plurality of number of times. The number of times the storage device 300 receives a read command and a random authentication address may vary depending on the number of bits of data used for performing an authentication operation or procedure. An example where the storage device 300 receives a read command and a random authentication address a plurality of number of times will be described below with reference to FIG. 7.

After performing the authentication operation or procedure, the storage device 300 may output result data corresponding to a result of performing the authentication operation or procedure (S130). The result data may be transmitted to the host 100.

The host 100 may receive the result data. At block S220, the host 100 may determine whether authentication has succeeded based on the result data. The host 100 may be configured to perform the same internal authentication operation or procedure as that performed in the storage device 300, and may compare a result of performing the internal authentication operation or procedure with the received result data to thereby determine whether authentication with respect to the storage device 300 has succeeded. The program 121 of the host 100 may determine whether the storage device 300 authentication has been performed according to a determined method based on the result data.

Because the system 10 that authenticates the storage device 300, according to some embodiments of the inventive concept, transmits a read command to the storage device 300 and performs an authentication operation or procedure, a non-volatile memory (for example, the non-volatile memory 340 of FIG. 2) of the storage device 300 does not need to have additional storage capacity for performing the authentication operation or procedure, in contrast with conventional authentication techniques where a write command and write data are transmitted and an authentication operation is performed. Accordingly, even when the non-volatile memory of the storage device 300 is full, the system 10 may perform an authentication operation.

Moreover, because the storage device 300 may perform an authentication operation or procedure by using a read command, the storage device 300 may perform the authentication operation or procedure even when write protection is set in the storage device 300.

Figure 4:
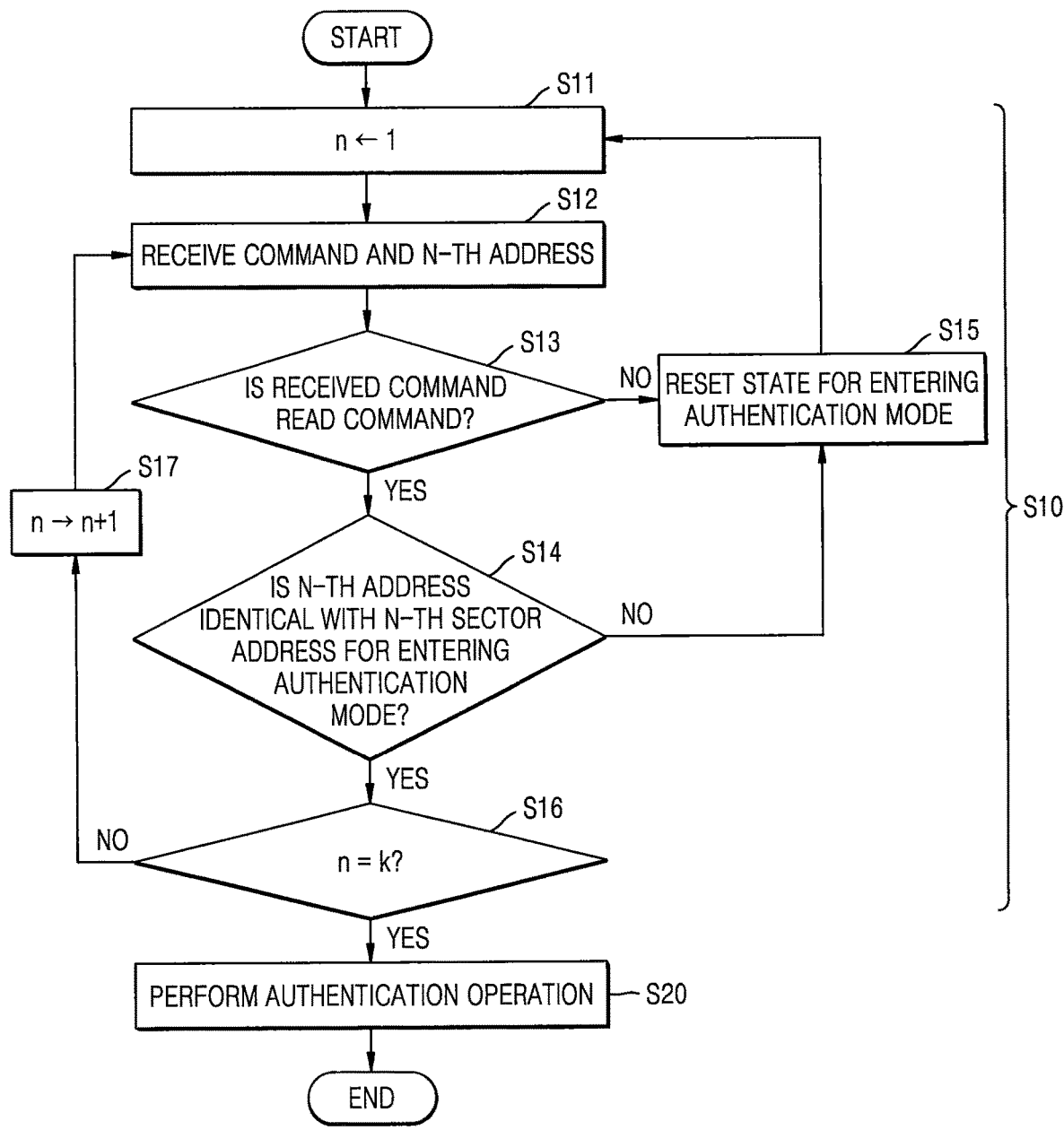
FIG. 4 is a flowchart of operations of a storage device included in a system according to some embodiments of the inventive concept.

FIG. 4 is a flowchart of operations of a system according to some embodiments of the inventive concept. Specifically, FIG. 4 illustrates operations of block S10 of FIG. 3 for the storage device 300 entering an authentication mode according to some embodiments of the inventive concept. According to some embodiments, the storage device 300 may enter authentication mode (block S10) when a user has requested the authentication mode to be performed via a user interface (for example, the user interface 130 of FIG. 1). According to another embodiment, the storage device 300 may enter authentication mode (block S10) under the control of a user after the storage device (for example, the storage device 300 of FIG. 1) is connected to an intermediate converter (for example, the intermediate converter 140 of FIG. 1).

Referring to FIGS. 1 and 4, when entering authentication mode (block S10), the storage device 300 may receive a command and an n-th address via the intermediate converter 140 (block S12). In some embodiments, n may be a natural number ranging from 1 to k, where k may be a natural number equal to or greater than 2. Accordingly, when entering authentication mode (block S10), the storage device 300 may receive a command and a first address (block S11).

At block S13, the storage device 300 may determine whether the received command is a read command. When the received command is a read command, the storage device 300 may determine whether the n-th address is identical with an n-th sector address for entering the authentication mode (block S14). When the n-th address is identical with the n-th sector address, the storage device 300 may determine whether n is identical with k (block S16). When n is not identical with k, the operations of blocks S13, S14, and S16 may be performed again with respect to n+1, instead of n, at block S17.

For example, when the first address is identical with a first sector address agreed to for entering the authentication mode, the storage device 300 may receive a command and a second address. The storage device 300 may determine whether the second address is identical with a second sector address for entering the authentication mode.

According to some embodiments, to enter the authentication mode, the host 100 and the storage device 300 may be configured to have agreed with first through k-th sector addresses within the storage device 300. Accordingly, the storage device 300 may sequentially determine whether the first through k-th addresses consecutively received from the host 100 are identical with the first through k-th sector addresses necessary for entering the authentication mode. When the k-th address input at a k-th order is identical with the k-th sector address, the storage device 300 may perform an authentication operation or procedure in the authentication mode (block S20). The k-th address may be a last address from among addresses that the storage device 300 needs to receive to enter the authentication mode.

When the received command is a write command other than a read command or when the received n-th address is not identical with the n-th sector address for entering the authentication mode, a state for entering the authentication mode may be reset (block S15). Accordingly, the storage device 300 may determine whether an address received later is identical with the first sector address, and may re-start the procedure for entering authentication mode (block S10).

While the read command and the first through k-th addresses are being received, when there are items of data stored in first through k-th memory regions respectively corresponding to the first through k-th addresses, the storage device 300 may output first through k-th data respectively stored in the first through k-th memory regions. The output first through k-th data may be transmitted to the host 100.

Figure 5:
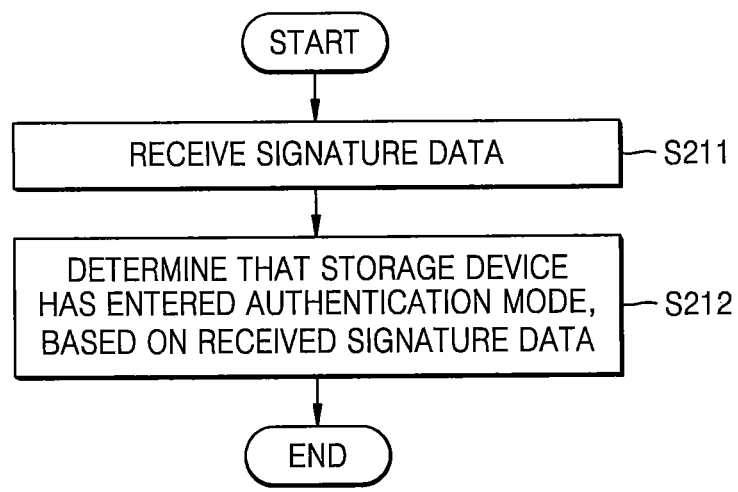
FIG. 5 is a flowchart of operations of a host included in a system according to some embodiments of the inventive concept.

FIG. 5 is a flowchart of an operation of a system, according to some embodiment of the inventive concept. FIG. 5 is a flowchart of example operations of the host 100 that are performed when the k-th address, which is the last address, is received and is identical with the k-th sector address.

Referring to FIGS. 1, 4, and 5, in response to the read command and the k-th address input at a k-th position in a sequential order, the storage device 300 may output signature data, which is pre-designated.

At block S211, the host 100 may receive the signature data. At block S212, the host 100 may determine that the storage device 300 has entered the authentication mode based on the received signature data. Thereafter, as the storage device 300 enters the authentication mode, the host 100 may output a command and a random address, such that the storage device 300 may perform an authentication operation or procedure in response thereto. The storage device 300 may perform an authentication operation or procedure based on the received random address.

According to some embodiments of the inventive concept, information about the signature data may be previously stored in the main memory 120 of the host 100. For example, the program 121 may compare the information about the signature data stored in the main memory 120 with signature data received via the intermediate converter 140 and ascertain that the storage device 300 has performed an authentication operation or procedure in the authentication mode based on a result of the comparison. In other words, the host 100 may sequentially output the first through k-th addresses, such that the storage device 300 may enter the authentication mode, and may determine that the storage device 300 has entered the authentication mode based on signature data received from the storage device 300.

Figure 6:
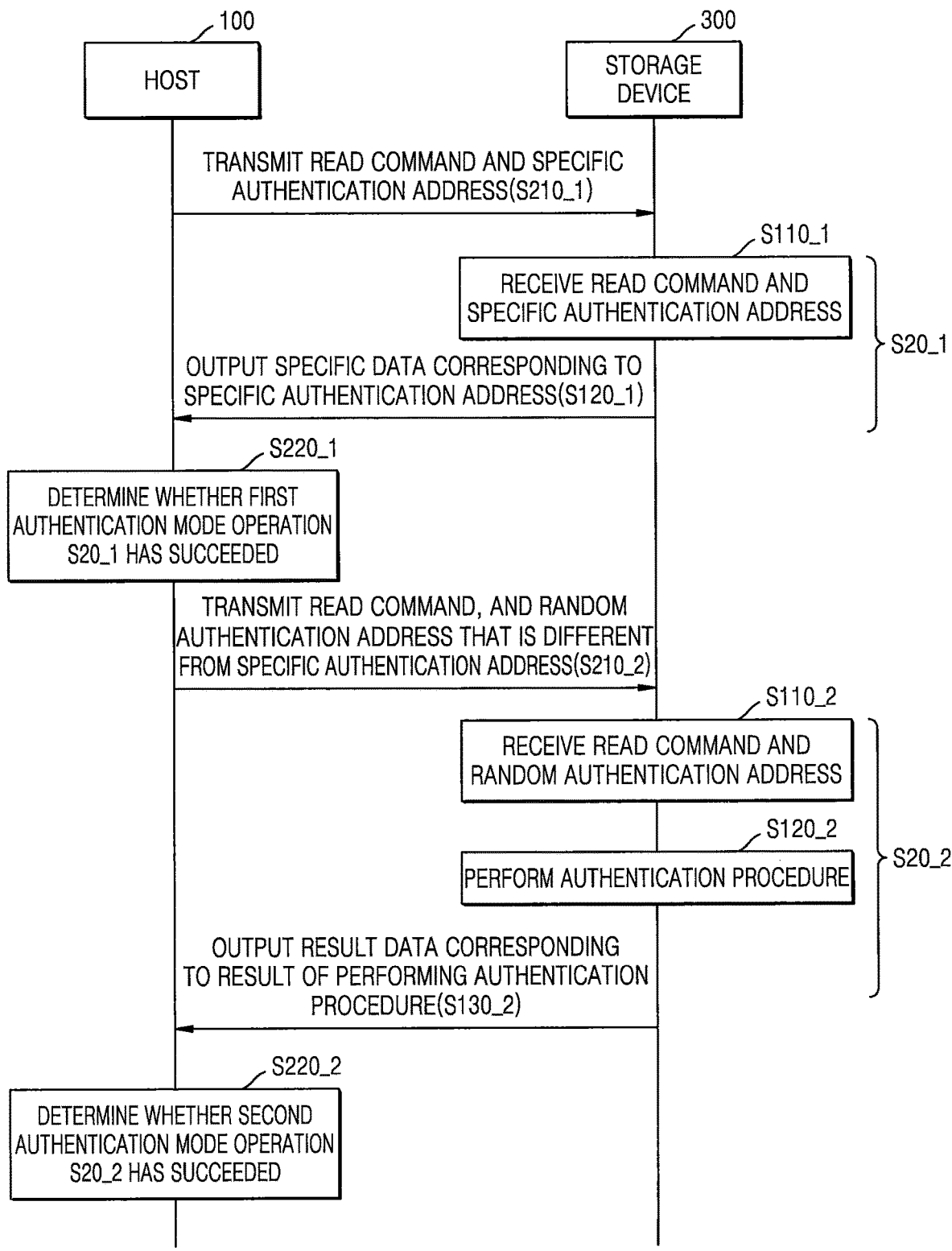
FIG. 6 is a flowchart of operations of a system according to some embodiments of the inventive concept.

FIG. 6 is a flowchart of an operation of a system according to some embodiments of the inventive concept. FIG. 6 is a flowchart of operations of block S20 of FIG. 3 in which the storage device 300 performs an authentication operation or procedure in the authentication mode according to some embodiments of the inventive concept. The storage device 300 may perform a first authentication mode operation (S20_1) and a second authentication mode operation (S20_2) in the authentication mode (S20). The first authentication mode operation (S20_1) may be performed by receiving a specific authentication address set to a specific value, and the second authentication mode operation (S20_2) may be performed by receiving a random authentication address. The second authentication mode operation (S20_2) may be performed similar to an operation in the authentication mode (S20) of FIG. 3.

Referring to FIGS. 1 and 6, when the storage device 300 enters the authentication mode, the host 100 may transmit a read command and a specific authentication address at block S2101. In contrast with the random authentication address, the specific authentication address may be an address agreed to between the host 100 and the storage device 300, namely, a predetermined address.

The storage device 300 may perform the first authentication mode operation (S20_1) by receiving the read command and the specific authentication address from the intermediate converter 140 at block S110_1. The storage device 300 may output specific data corresponding to the specific authentication address (S120_1). A value of the specific data may be a value agreed to between the host 100 and the storage device 300 to perform the first authentication mode operation (S20_1).

The host 100 may receive the specific data. At block S220_1, the host 100 may determine whether the first authentication mode operation (S20_1) of the storage device 300 has succeeded based on the received specific data. In other words, when the value of the specific data is a value agreed to between the host 100 and the storage device 300, the host 100 may determine that the first authentication mode operation (S20_1) has succeeded, and may perform the second authentication mode operation (S20_2). On the other hand, when the value of the specific data is different from the agreed upon value, the host 100 may determine that authentication has failed.

When it is determined that the first authentication mode operation (S20_1) of the storage device 300 has succeeded, the host 100 may transmit a read command, and a random authentication address different from the specific authentication address, such that the storage device 300 may perform the second authentication mode operation (S20_2) (S210_2).

At block S110_2, the storage device 300 may receive the read command and the random authentication address via the intermediate converter 140. The random authentication address does not have a determined specific value and may have a random value. The random authentication address may be different from the specific authentication address used during the first authentication mode operation (S20_1).

At block S120_2, the storage device 300 may perform an authentication operation or procedure by using at least a portion of the received random authentication address as data for performing the authentication operation or procedure. The storage device 300 may generate result data by performing the authentication operation or procedure, and output the result data (S130_2). Accordingly, the storage device 300 may output specific data corresponding to a specific authentication address only when the specific authentication address is received. When a random authentication address other than the specific authentication address is received, the storage device 300 may use at least a portion of the random authentication address as data of the authentication operation or procedure.

The host 100 may receive the result data. At block S220_2, the host 100 may determine whether the second authentication mode operation (S20_2) of the storage device 300 has succeeded based on the result data.

Although the first authentication mode operation (S20_1) is followed by the second authentication mode operation (S20_2) in FIG. 6, systems and methods of authenticating a storage device according to embodiments of the inventive concept are not limited thereto. The second authentication mode operation (S20_2) may be followed by the first authentication mode operation (S20_1) in other embodiments.

The host 100 may determine whether an entire authentication operation or procedure has succeeded based on whether the first authentication mode operation (S20_1) and the second authentication mode operation (S20_2) have succeeded.

Because the system 10 that authenticates the storage device 300 according to embodiments of the inventive concept transmits a read command to the storage device 300 and performs the first (S20_1) and second (S20_2) authentication mode operations, the storage device 300 does not need to have additional storage capacity, in contrast with conventional authentication techniques where a write command and write data are used. Accordingly, even when the storage device 300 is full, the system 10 is able to perform an authentication operation or procedure.

Moreover, because the storage device 300 performs the first (S20_1) and second (S20_2) authentication mode operations by using the read command, even when write protection is set in the storage device 300, the storage device 300 is able to perform an authentication operation or procedure.

Figure 7:
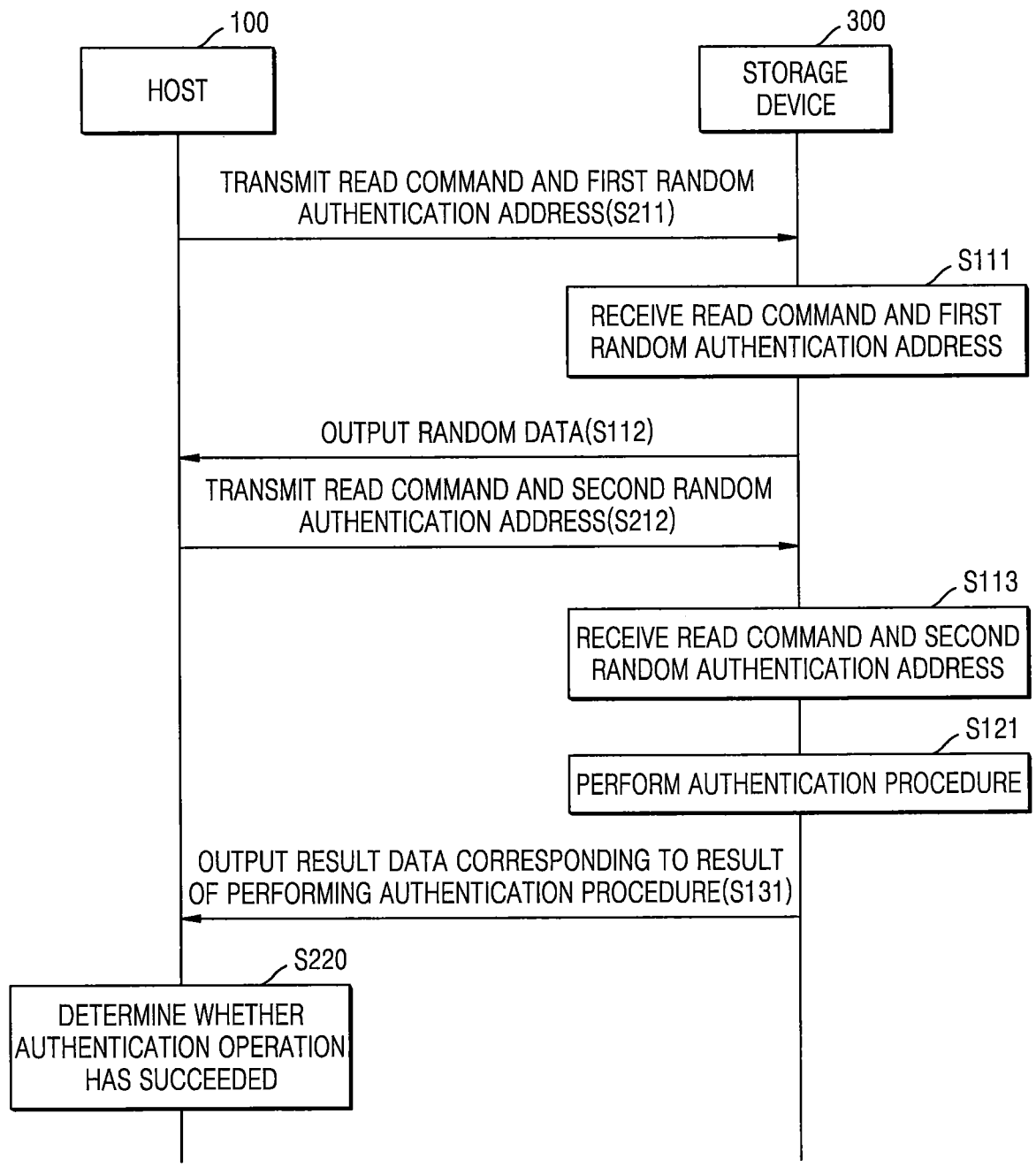
FIG. 7 is a flowchart of operations of a system according to further embodiment of the inventive concept.

FIG. 7 is a flowchart of operation of a system, according to further embodiments of the inventive concept. FIG. 7 is a flowchart of example authentication operations (S20) of FIG. 3 in which the storage device 300 performs an authentication operation in the authentication mode, according to further embodiments. FIG. 7 illustrates an example where the storage device 300 receives a read command and a random authentication address a plurality of number of times.

Referring to FIGS. 1 and 7, the storage device 300 may receive the read command and the random authentication address a plurality of number of times. When the number of bits of data used for performing an authentication operation or procedure is greater than the number of bits of the random authentication address, the storage device 300 may receive the random authentication address a plurality of times and may obtain data used for performing the authentication operation or procedure from the received plurality of random authentication addresses. An example of receiving a first random authentication address and a second random authentication address will now be illustrated and described.

When the storage device 300 enters the authentication mode, the host 100 may transmit the read command and the first random authentication address (S211). The first random authentication address may not have a determined specific value and may have a random value.

At block S111, the storage device 300 may receive the read command and the first random authentication address from the intermediate converter 140. At least a portion of the first random authentication address that is to be used to perform an authentication operation or procedure may be temporarily stored in a local memory (for example, the local memory 330 of FIG. 2) in the storage device 300.

The storage device 300 may output random data in response to the received read command (S112). The random data may include a message indicating that the read command and the first random authentication address have been successfully received, or a message indicating that at least a portion of the first random authentication address has been stored in the internal local memory, and the random data may be data irrelevant to execution of the authentication operation or procedure in accordance with various embodiments of the inventive concept.

The host 100 may receive the random data. The host 100 may transmit the read command and the second random authentication address (S212). At block S113, the storage device 300 may receive the read command and the second random authentication address from the intermediate converter 140. At least a portion of the second random authentication address that is to be used to perform an authentication operation or procedure may be temporarily stored in the local memory in the storage device 300.

In operation S121, the storage device 300 may perform an authentication operation or procedure by using the stored portion or all of the first random authentication address and the stored portion or all of the second random authentication address as data for performing the authentication operation or procedure. Although the first random authentication address and the second random authentication address are described with reference to FIG. 7, the number of times the storage device 300 receives a read command and a random authentication address may vary according to the number of bits of the data used for performing the authentication operation or procedure, and may vary according to the number of bits of the received random authentication address. As the number of bits of the data used for performing the authentication operation or procedure increases, the number of times the host 100 outputs the random authentication address may increase, and the number of times the storage device 300 receives the random authentication address may also increase. The number of random authentication addresses transmitted or received between the host 100 and the storage device 300 may be predetermined.

The storage device 300 may output result data corresponding to a result of performing the authentication algorithm (S131). Because the number of random authentication addresses transmitted or received between the host 100 and the storage device 300 is predetermined, the host 100 may determine that the result data is a result of performing the authentication operation or procedure, rather than the random data prior to the result data.

The host 100 may receive the result data. At block S220, the host 100 may determine whether the authentication operation of the storage device 300 has succeeded based on the result data. The program 121 of the host 100 may determine whether the authentication operation has been performed based on the result data.

Figure 8:
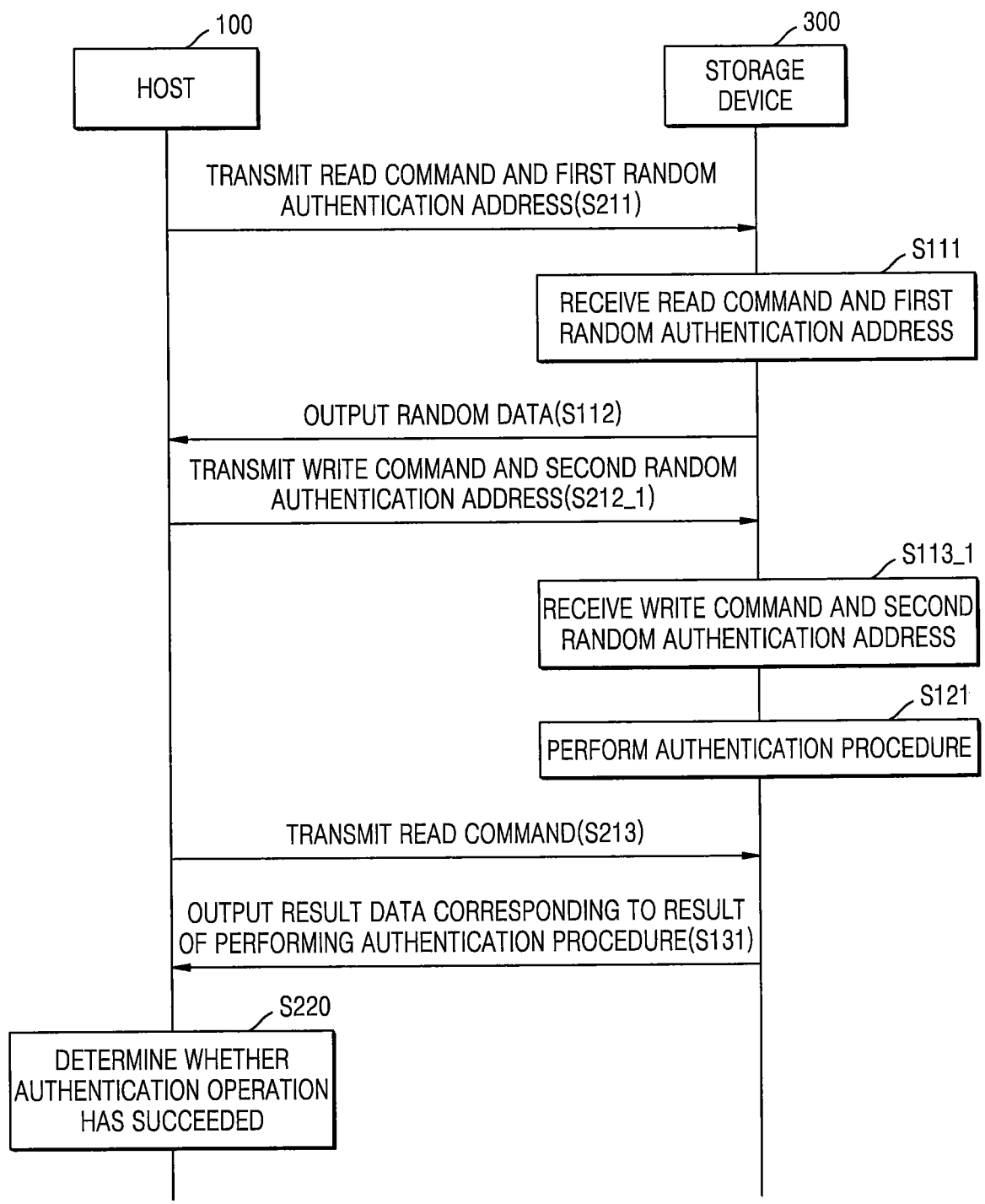
FIG. 8 is a flowchart of operations of a system according to further embodiments of the inventive concept.

FIG. 8 is a flowchart of operations of a system according to further embodiments of the inventive concept. FIG. 8 is a flowchart of example authentication operations (S20) of FIG. 3 in which the storage device 300 performs an authentication operation in the authentication mode, according to further embodiments. FIG. 8 illustrates an example where the storage device 300 receives a random authentication address a plurality of number of times. In contrast with FIG. 7, in FIG. 8, the storage device 300 may receive a write command. Reference numerals of FIG. 8 that are the same as those of FIG. 7 will not be described again in the interest of conciseness.

Referring to FIGS. 1 and 8, after the host 100 transmits a read command and a first random authentication address (S211), the host 100 may receive random data, and then may transmit a write command and a second random authentication address (S212_1). The host 100 may also output write data that is to be requested to be written.

At block S113_1, the storage device 300 may receive the write command and the second random authentication address from the intermediate converter 140. At least a portion of the second random authentication address that is to be used to perform an authentication operation or procedure may be temporarily stored in a local memory (for example, the local memory 330 of FIG. 2) in the storage device 300. The storage device 300 may also receive the write data that is to be requested to be written, but, because the storage device 300 is performing an authentication operation instead of a general operation, the received write data is not written to the storage device 300. Although the operation of block S111 is followed by the operation of block S113_1 in FIG. 8, a system according to embodiments of the inventive concept is not limited thereto. Accordingly, the storage device 300 may receive the read command and the first random authentication address after receiving the write command and the second random authentication address.

At block S121, the storage device 300 may perform an authentication operation or procedure by using, as data, the stored portion or all of the first random authentication address and the stored portion or all of the second random authentication address. The storage device 300 may perform an authentication operation or procedure by using, as data, random authentication addresses received together with a read command or a write command.

The host 100 may transmit a read command to the storage device 300 (S213). The read command is a command that enables the storage device 300 to output result data obtained by performing the authentication operation or procedure and transmit the result data to the host 100.

The storage device 300 may output result data corresponding to a result of performing the authentication operation or procedure in response to the read command (S131). At block S220, the host 100 may determine whether authentication operation of the storage device 300 has succeeded based on the result data.

Although the first random authentication address and the second random authentication address are described with reference to FIG. 8, the number of times the storage device 300 receives a read/write command and a random authentication address may vary according to the number of bits of data used for performing the authentication operation or procedure, and may vary according to the number of bits of the received random authentication address.

Because the storage device 300 included in a system according to some embodiments of the inventive concept does not perform an operation corresponding to a read command or a write command when receiving the read command or the write command in the authentication mode, the storage device 300 may perform an authentication operation based on a random authentication address that is received together with the read or write command regardless of the type of command. Accordingly, the storage device 300 may receive a read command or a write command in the authentication mode and perform an authentication operation or procedure in response thereto.

Figure 9:
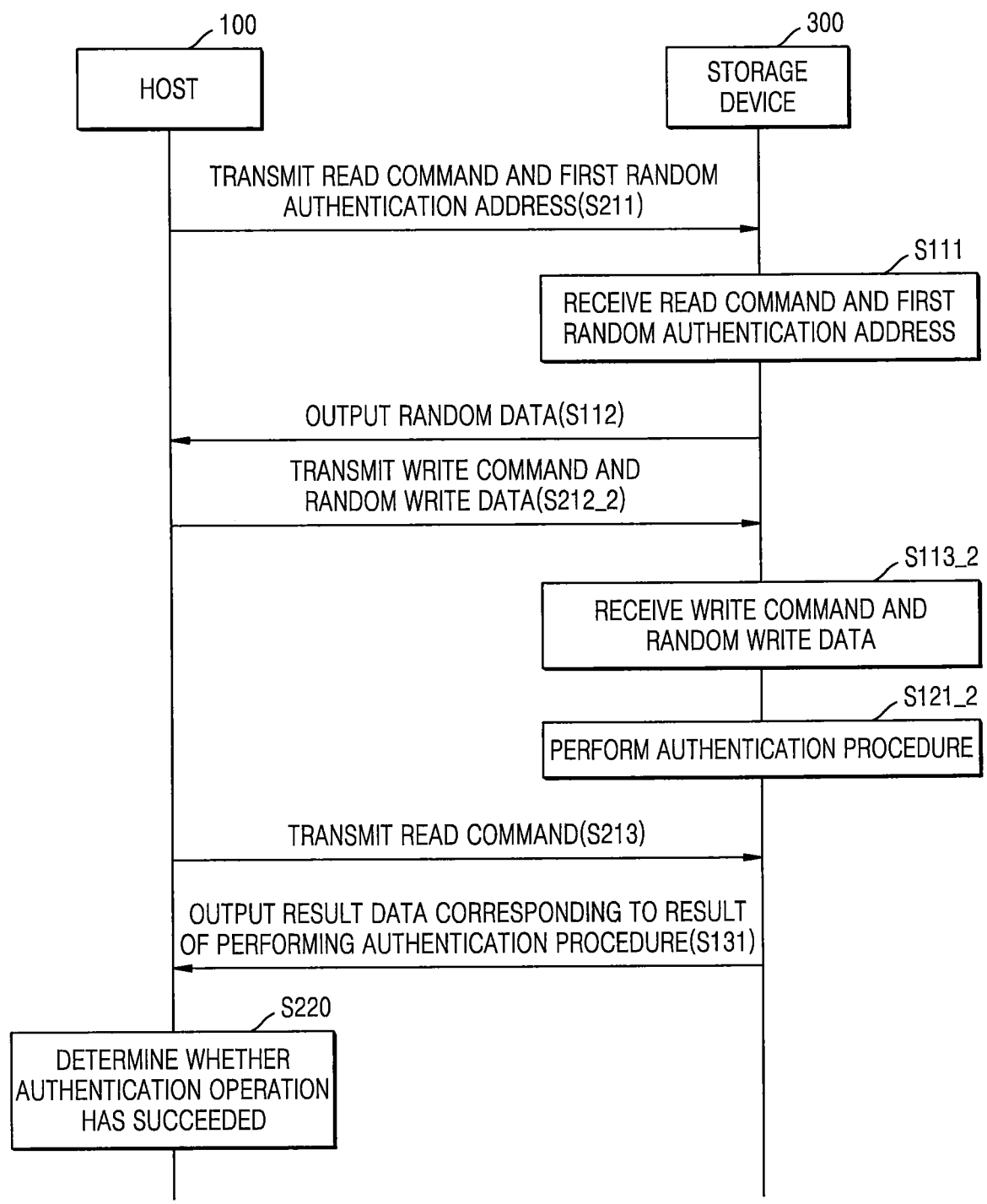
FIG. 9 is a flowchart of operations of a system according to further embodiments of the inventive concept.

FIG. 9 is a flowchart of a method of operating a system, according to further embodiment of the inventive concept. FIG. 9 is a flowchart of example authentication operations (S20) of FIG. 3 in which the storage device 300 performs an authentication operation in the authentication mode, according to further embodiments. FIG. 9 illustrates an example where the storage device 300 receives a read command or a write command a plurality of number of times in the authentication mode. Thus, in FIG. 9, the storage device 300 may receive a write command, in contrast with FIG. 7. Reference numerals of FIG. 9 that are the same as those of FIG. 7 will not be described again in the interest of conciseness.

Referring to FIGS. 1 and 9, after the host 100 transmits a read command and a first random authentication address (S211), the host 100 may receive random data, and then may transmit a write command and random write data (S212_2). At this time, the host 100 may also output a write address.

At block S113_2, the storage device 300 may receive the write command and the random write data from the intermediate converter 140. When the storage device 300 receives the random write data, more pieces of information necessary for performing an authentication operation or procedure may be transmitted to the storage device 300 than when the storage device 300 receives a random authentication address. Accordingly, when the random write data is received and is used to perform an authentication operation or procedure, the number of times the host 100 and the storage device 300 transmit or receive a command, a random authentication address, and random write data may be reduced.

The storage device 300 may temporarily store at least a portion of the random write data that is to be used to perform an authentication operation or procedure, in a local memory (for example, the local memory 330 of FIG. 2) in the storage device 300. Because the storage device 300 is performing the authentication operation, the storage device 300 may not write the random write data to a non-volatile memory (for example, the non-volatile memory 340 of FIG. 2) of the storage device 300. The random write data may only be used in performing the authentication operation. Although the operation of block S111 is followed by the operation of block S113_2 in FIG. 9, systems according to embodiments of the inventive concept are not limited thereto. Accordingly, the storage device 300 may receive a read command and a first random authentication address after receiving a write command and random write data.

At block S121_2, the storage device 300 may perform an authentication operation or procedure by using the stored portion or all of the first random authentication address and the stored portion or all of the random write data as data for performing the authentication algorithm.

The host 100 may transmit to the storage device 300 a read command that enables the storage device 300 to output result data obtained by performing the authentication algorithm (S213). The storage device 300 may output result data corresponding to a result of performing the authentication operation or procedure in response to the read command (S131). At block S220, the host 100 may determine whether authentication operation of the storage device 300 has succeeded based on the result data.

Figure 10:
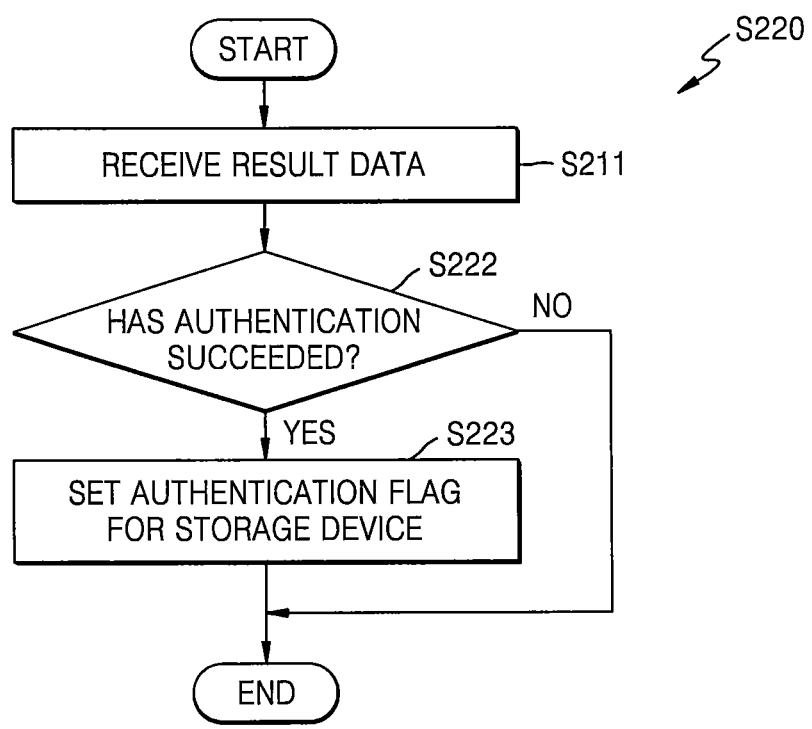
FIG. 10 is a flowchart of operations of a host included in a system according to further embodiments of the inventive concept.

FIG. 10 is a flowchart of operations of a system according to further embodiments of the inventive concept. FIG. 10 is a flowchart of example operations of the host 100 for determining whether authentication succeeded (block S220 of FIG. 3).

Referring to FIGS. 1 and 10, the host 100 may receive the result data at block S211. At block S222, the host 100 may determine whether authentication has succeeded based on the result data. The program 121 of the host 100 may include the same internal logic as that stored in the storage device 300. The program 121 may determine whether an authentication operation of the storage device 300 has succeeded by comparing a result of performing the internal authentication operation or procedure with the received result data. For example, when the result of performing the internal authentication operation or procedure is irrelevant to the received result data, the program 121 may determine that authentication has failed.

At block S223, when authentication with respect to the storage device 300 has succeeded, the host 100 may set an authentication flag for the storage device 300. The authentication flag is a flag indicating that the storage device 300 has completed authentication, and may be stored in the storage device 300. The host 100 may check the authentication flag stored in the storage device 300 when there is a differentiated demand with respect to the storage device 300. After ascertaining that authentication with respect to the storage device 300 has been completed, the host 100 may request the storage device 300 to perform a specific operation.

Figure 11:
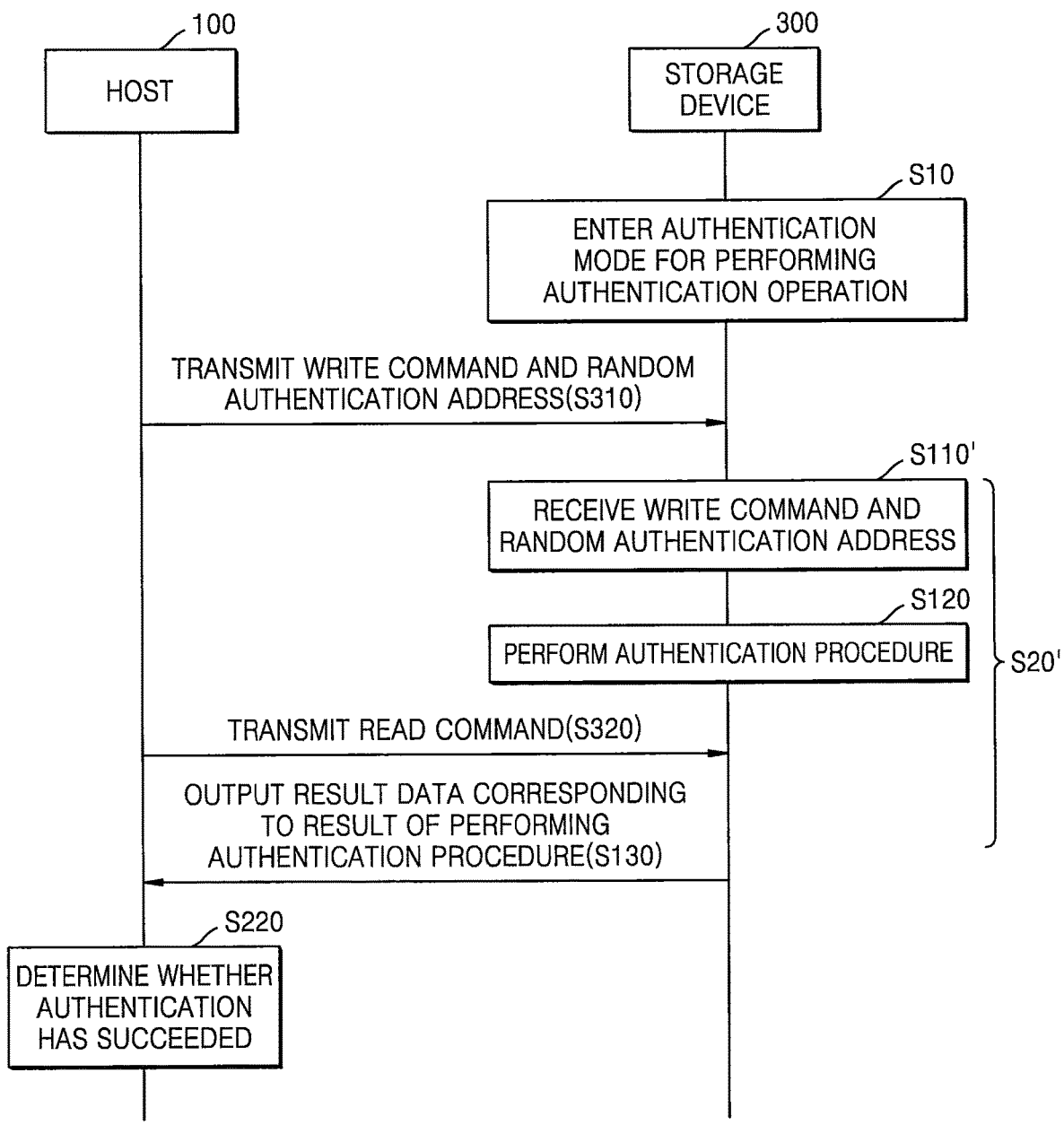
FIG. 11 is a flowchart of operations of a system according to further embodiments of the inventive concept.

FIG. 11 is a flowchart of an authenticating method performed by a system that authenticates a storage device, according to further embodiments of the inventive concept. Reference numerals of FIG. 11 that are the same as those of FIG. 3 will not be described again here. In contrast with FIG. 3, FIG. 11 illustrates an example where a write command is received by a storage device.

Referring to FIGS. 1 and 11, when the storage device 300 enters an authentication mode for performing an authentication operation, at block S10, the storage device 300 may perform an authentication operation in the authentication mode (S20'). The description of FIG. 4 may be applied to the operation of block S10 for entering the authentication mode.

When the storage device 300 enters the authentication mode at block S10, the host 100 may transmit a write command and a random authentication address (S310). In the authentication mode (S20'), the storage device 300 may receive the write command and the random authentication address via the intermediate converter 140 at block S110'. The random authentication address does not have a determined specific value and may have a random value.

At block S120, the storage device 300 may perform an authentication operation or procedure by using at least a portion of the received random authentication address as data for performing the authentication operation or procedure. In the authentication mode (S20'), even when the storage device 300 receives a write command, the storage device 300 may not perform an operation based on the received write command. Accordingly, even when write data is output together with the write command and the random authentication address (S310) and the storage device 300 receives the write data, the storage device 300 may not perform a write operation with respect to the received write data.

According to some embodiments, the storage device 300 may receive the write command and the random authentication address a plurality of number of times. The number of times the storage device 300 receives the write command and the random authentication address may vary depending on the number of bits of the data necessary for performing an authentication operation or procedure. An example where the storage device 300 receives the write command and the random authentication address a plurality of number of times will be described below with reference to FIG. 12.

The host 100 may transmit a read command to the storage device 300 (S320). The read command is a command that enables the storage device 300 to output result data obtained by performing the authentication operation or procedure and transmit the result data to the host 100. The storage device 300 may output result data corresponding to a result of performing the authentication operation or procedure in response to the read command (S130). The result data may be transmitted to the host 100. The host 100 may receive the result data via an intermediate converter. At block S220, the host 100 may determine whether authentication has succeeded based on the result data.

The system 10 that authenticates a storage device according to embodiments of the inventive concept transmits a write command to the storage device 300 and performs an authentication operation, but may not perform a write operation in the authentication mode. Accordingly, the non-volatile memory (for example, the non-volatile memory 340 of FIG. 2) of the storage device 300 does not need an additional storage capacity for performing the authentication operation, and, even when the non-volatile memory of the storage device 300 is full, the system 10 is able to perform the authentication operation.

FIG. 12 is a flowchart of a method of operating a system, according to further embodiments of the inventive concept. FIG. 12 is a flowchart of example authentication operations (S20') of FIG. 11 in which the storage device 300 performs an authentication operation in the authentication mode according to some embodiments. FIG. 12 illustrates an example where the storage device 300 receives a write command and a random authentication address a plurality of number of times.

Referring to FIG. 12, the storage device 300 may receive the write command and the random authentication address a plurality of number of times. When the number of bits of data necessary for performing an authentication operation or procedure is greater than the number of bits of the random authentication address, the storage device 300 may receive the random authentication address a plurality of times and may obtain data necessary for performing the authentication operation or procedure from the received plurality of random authentication addresses.

When the storage device 300 enters the authentication mode, the host 100 may transmit a write command and a first random authentication address (S311). The first random authentication address does not have a determined specific value and may have a random value.

At block S111', the storage device 300 may receive the write command and the first random authentication address from the intermediate converter 140. At least a portion of the first random authentication address that is to be used to perform an authentication operation or procedure may be temporarily stored in the local memory (for example, the local memory 330 of FIG. 2) in the storage device 300. The host 100 may transmit a read command to the storage device 300 (S312). The read command may be a command for outputting a result obtained by receiving the first random authentication address. The storage device 300 may output a response in response to the received read command (S112'). The response may include a message indicating that the write command and the first random authentication address have been successfully received, or a message indicating that at least a portion of the first random authentication address has been stored in the internal local memory, and the response may be data irrelevant to execution of the authentication operation or procedure.

The host 100 may receive the random data, and may transmit a write command and a second random authentication address (S313). At block S113', the storage device 300 may receive the write command and the second random authentication address from the intermediate converter 140. At least a portion of the second random authentication address that is to be used to perform an authentication operation or procedure may be temporarily stored in the internal local memory of the storage device 300.

At block S121, the storage device 300 may perform an authentication operation or procedure by using the stored portion or all of the first random authentication address and the stored portion or all of the second random authentication address as data for performing the authentication operation or procedure. Although the first random authentication address and the second random authentication address are described in FIG. 12, the number of times the storage device 300 receives a random authentication address may vary according to the number of bits of the data necessary for performing the authentication operation or procedure, and may vary according to the number of bits of the received random authentication address. The number of random authentication addresses transmitted or received between the host 100 and the storage device 300 may be predetermined.

The host 100 may receive a read command (S320). The read command is a command that enables the storage device 300 to output a result of performing the authentication operation or procedure and transmit the result to the host 100. The storage device 300 may output result data corresponding to a result of performing the authentication operation or procedure in response to the read command (S131). The host 100 may receive the result data. At block S220, the host 100 may determine whether the authentication operation of the storage device 300 has succeeded based on the result data.

FIG. 13 is a flowchart of a method of operating a system, according to some embodiment of the inventive concept. FIG. 13 is a flowchart of example authentication operations (S20') of FIG. 11 in which the storage device 300 performs an authentication operation in the authentication mode, according to some embodiments. FIG. 13 illustrates an example where the storage device 300 receives a write command a plurality of number of times in an authentication mode.

Referring to FIG. 13, after the host 100 transmits a write command and a first random authentication address (S311), the host 100 may transmit a read command (S312), and, thus, may receive a response to the read command. The host 100 may transmit a write command and random write data based on the received response (S313_2). At this time, the host 100 may also output a write address.

At block S113_2', the storage device 300 may receive the write command and the random write data from the intermediate converter 140. At least a portion of the random write data that is to be used to perform an authentication operation or procedure may be temporarily stored in the internal local memory (for example, the local memory 330 of FIG. 2) of the storage device 300. Because the storage device 300 is performing the authentication operation, the storage device 300 does not write the random write data to the non-volatile memory (for example, the non-volatile memory 340 of FIG. 2) of the storage device 300. The random write data may only be used in performing the authentication operation.

Although the operation of block S111' is followed by the operation of block S113_2' in FIG. 13, a system according to embodiments of the inventive concept is not limited thereto. Accordingly, the storage device 300 may receive a read command and a first random authentication address after receiving a write command and random write data.

At block S121_2', the storage device 300 may perform an authentication operation or procedure by using the stored portion or all of the first random authentication address and the stored portion or all of the random write data as data for performing the authentication operation or procedure.

The host 100 may transmit a read command that enables the storage device 300 to output a result of performing the authentication operation or procedure and transmit the result to the host 100 (S320). The storage device 300 may output result data corresponding to the result of performing the authentication operation or procedure in response to the read command (S131). At block S220, the host 100 may determine whether the authentication operation of the storage device 300 has succeeded based on the result data.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the inventive concept has been particularly shown and described with reference to embodiments thereof, it will be understood that various changes in form and details may be made therein without departing from the spirit and scope of the following claims.

What is claimed is:

1. A method of operating a storage device that is connected to a host, comprising:
  entering an authentication mode; and
  performing an authentication operation responsive to entering the authentication mode,
  wherein the performing of the authentication operation comprises:

receiving a read command with a first random authentication address from the host;
performing an authentication procedure by executing an authentication algorithm using at least a portion of the first random authentication address; and
generating result data responsive to performing the authentication procedure.

2. The method of claim 1, wherein
the entering of the authentication mode comprises:
sequentially receiving a command and first through k-th addresses from the host; and
determining whether each of the first through k-th addresses is identical with each of first through k-th sector addresses for entering the authentication mode, and
wherein performing the authentication operation comprises:
performing the authentication operation responsive to determining that each of the first through k-th addresses is identical with each of the first through k-th sector addresses, wherein k is a positive integer.

3. The method of claim 2, wherein the entering of the authentication mode further comprises resetting a state for entering the authentication mode in response to a write command received from the host.

4. The method of claim 2, further comprising:
resetting a state for entering the authentication mode responsive to determining that each of the first through k-th addresses is not identical with each of the first through k-th sector addresses.

5. The method of claim 1, wherein the performing of the authentication operation comprises:
receiving a read command and a specific authentication address that is predetermined from the host; and
outputting specific data corresponding to the specific authentication address.

6. The method of claim 5, wherein the first random authentication address is different from the specific authentication address.

7. The method of claim 1, wherein the performing of the authentication operation further comprises:
receiving a read command with a second random authentication address from the host; and
wherein performing the authentication procedure comprises performing the authentication procedure using at least a portion of the second random authentication address.

8. The method of claim 1, wherein the performing of the authentication operation further comprises:
receiving a write command with a second random authentication address from the host; and
wherein performing the authentication procedure comprises performing the authentication procedure using at least a portion of the second random authentication address.

9. The method of claim 1, wherein the performing of the authentication operation further comprises:
receiving a write command and write data from the host; and
wherein performing the authentication procedure comprises performing the authentication procedure based on at least a portion of the write data.

10. A method of operating a storage device that is connected to a host, comprising:
entering an authentication mode; and
performing an authentication operation responsive to entering the authentication mode,
wherein the performing of the authentication operation further comprises:
receiving a write command with a first random authentication address from the host;
performing an authentication procedure by executing an authentication algorithm using at least a portion of the first random authentication address; and
generating result data responsive to performing the authentication procedure.

11. The method of claim 10, wherein
the entering of the authentication mode comprises:
sequentially receiving a read command and first through k-th addresses from the host; and
determining whether each of the first through k-th addresses is identical with each of first through k-th sector addresses for entering the authentication mode, and
wherein performing the authentication operation comprises:
performing the authentication operation responsive to determining that each of the first through k-th addresses is identical with each of the first through k-th sector addresses, wherein k is a positive integer.

12. The method of claim 10, wherein the performing of the authentication operation further comprises:
receiving a write command with a second random authentication address from the host;
wherein performing the authentication procedure comprises performing the authentication procedure using at least a portion of the second random authentication address.

13. The method of claim 10, wherein the performing of the authentication operation further comprises:
receiving a write command and write data from the host; and
wherein performing the authentication procedure comprises performing the authentication procedure based on at least a portion of the write data.

14. A system comprising:
a storage device configured to perform an authentication operation in an authentication mode; and
a host that is configured to perform the authentication operation performed by the storage device,
wherein, in the authentication mode, the storage device is further configured to receive a read command with a random authentication address from the host, to perform an authentication procedure by executing an authentication algorithm using at least a portion of the random authentication address, and to generate result data responsive to performing the authentication procedure.

15. The system of claim 14, wherein
the host is further configured to output a read command and first through k-th addresses, and
the storage device is further configured to perform the authentication operation when each of the first through k-th addresses received from the host is identical with each of first through k-th sector addresses for entering the authentication mode.

16. The system of claim 15, wherein
the storage device is further configured to output k-th data corresponding to the k-th address, and
the host is further configured to receive the k-th data, and to transmit the read command with the random authentication address to the storage device, based on the k-th data.

17. The system of claim 14, wherein, in the authentication mode, the storage device is further configured to receive a read command and a specific authentication address that is predetermined, from the host, and to output specific data corresponding to the specific authentication address.

18. The system of claim 14, wherein, in the authentication mode, the storage device is further configured to receive the read command with the random authentication address from the host a plurality of number of times, and to perform the authentication procedure using at least respective portions of the random authentication addresses received the plurality of number of times.

19. The system of claim 18, wherein
the host and the storage device respectively comprise internal memories, and
the internal memory of the host and the internal memory of the storage device are configured to store a number of times the read command and the random authentication address is transmitted or received.

20. The system of claim 14, wherein the host is further configured to receive the result data, and to set an authentication flag for the storage device based on the result data.

* * * * *